(12) United States Patent
Peterson et al.

(10) Patent No.: US 7,667,893 B2
(45) Date of Patent: Feb. 23, 2010

(54) MICROLENS FRONT PROJECTION SCREEN

(75) Inventors: Mark D. Peterson, Lake Oswego, OR (US); David E. Slobodin, Lake Oswego, OR (US)

(73) Assignee: Seiko Epson Corporation, Suwa-shi, Nagano-ken (JP)

( * ) Notice: Subject to any disclaimer, the term of this patent is extended or adjusted under 35 U.S.C. 154(b) by 424 days.

(21) Appl. No.: 11/550,375

(22) Filed: Oct. 17, 2006

(65) Prior Publication Data

US 2007/0146876 A1  Jun. 28, 2007

Related U.S. Application Data

(63) Continuation-in-part of application No. 11/400,699, filed on Apr. 6, 2006, now abandoned.

(60) Provisional application No. 60/669,251, filed on Apr. 6, 2005.

(51) Int. Cl.
G03B 21/60 (2006.01)
(52) U.S. Cl. .................... 359/455; 359/459
(58) Field of Classification Search ............. 359/449, 359/459, 454–455
See application file for complete search history.

(56) References Cited

U.S. PATENT DOCUMENTS

| 3,704,055 | A | * | 11/1972 | Hong ................... 359/455 |
| 4,232,939 | A | * | 11/1980 | Kikuchi ................ 359/459 |
| 4,666,248 | A |   | 5/1987  | van de Ven |
| 4,911,529 | A | * | 3/1990  | Van De Ven .......... 359/454 |
| 5,096,278 | A | * | 3/1992  | Yoshioka et al. ....... 359/459 |
| 5,210,641 | A | * | 5/1993  | Lewis .................. 359/448 |
| 6,788,460 | B2 |  | 9/2004  | Knox et al. |
| 6,816,306 | B2 | * | 11/2004 | Freese et al. .......... 359/456 |
| 7,009,765 | B2 |  | 3/2006  | Gohman |
| 7,016,111 | B2 |  | 3/2006  | Chubachi et al. |
| 7,019,899 | B2 |  | 3/2006  | Chubachi et al. |
| 7,262,912 | B2 | * | 8/2007  | Wood .................. 359/459 |
| 7,433,122 | B2 | * | 10/2008 | Peterson .............. 359/454 |
| 2004/0252373 | A1 |  | 12/2004 | Umeya |
| 2005/0030617 | A1 |  | 2/2005  | Umeya |
| 2005/0041285 | A1 |  | 2/2005  | Umeya |
| 2005/0057804 | A1 |  | 3/2005  | Umeya et al. |
| 2005/0063054 | A1 |  | 3/2005  | Umeya |
| 2005/0068620 | A1 |  | 3/2005  | Umeya |
| 2005/0068621 | A1 |  | 3/2005  | Umeya |
| 2005/0122582 | A1 |  | 6/2005  | Umeya |
| 2005/0122583 | A1 |  | 6/2005  | Umeya |
| 2005/0152031 | A1 |  | 7/2005  | Umeya |

* cited by examiner

*Primary Examiner*—Christopher Mahoney
(74) *Attorney, Agent, or Firm*—Townsend and Townsend and Crew LLP

(57) ABSTRACT

A display screen is provided. The display screen may be configured to receive an image from a display device, and includes a first surface with a topography configured to transmit light from the image, and a second surface configured with light reflecting portions and light absorbing portions. The light reflecting portions may be configured to substantially reflect light transmitted from the first surface, and the light absorbing portions may be configured to substantially absorb environmental light.

17 Claims, 5 Drawing Sheets

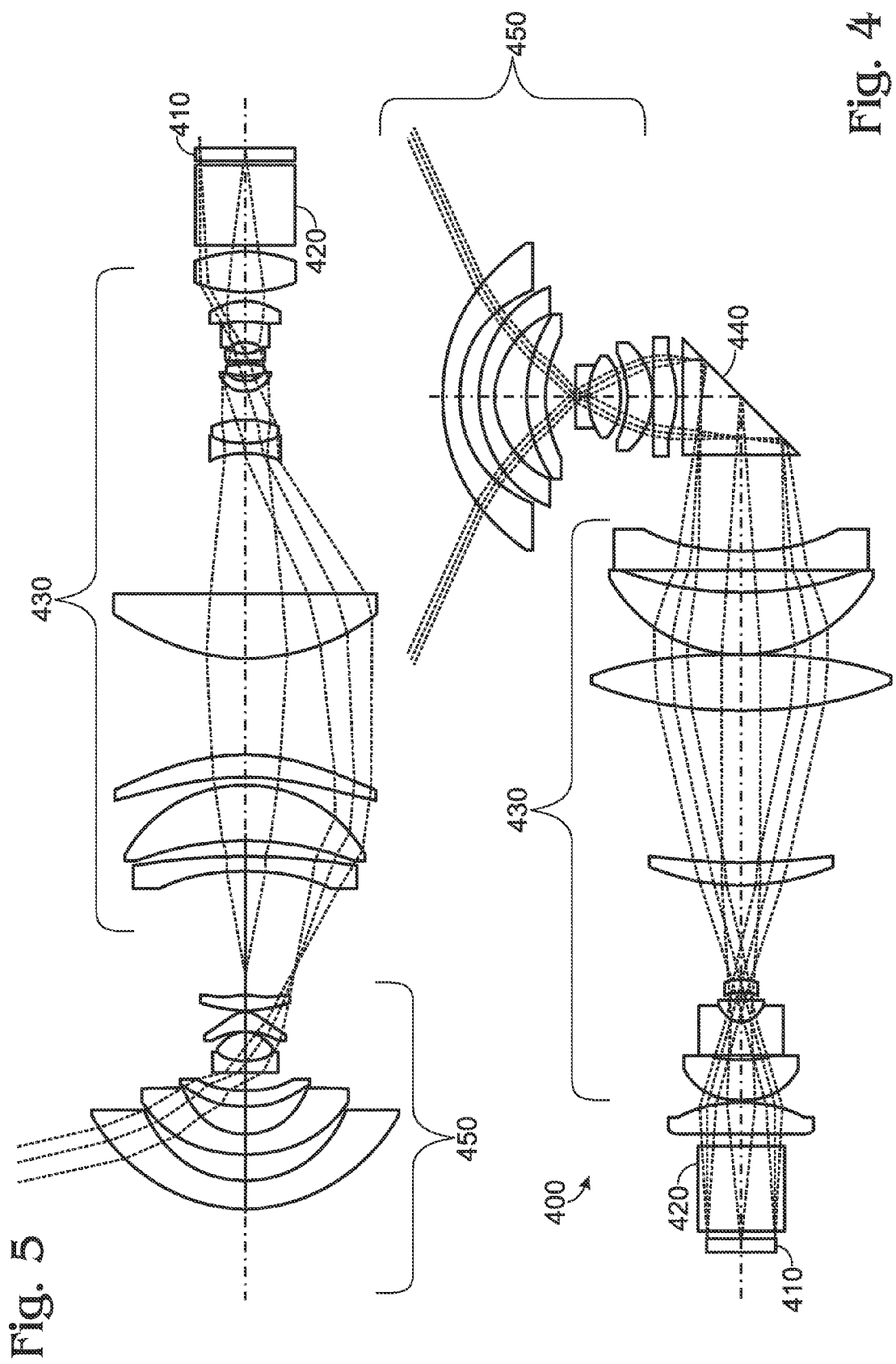

MICROLENS FRONT PROJECTION SCREEN

CROSS-REFERENCES TO RELATED APPLICATIONS

This application is a continuation-in-part of and claims priority to U.S. patent application Ser. No. 11/400,699 filed Apr. 6, 2006 entitled MICROLENS FRONT PROJECTION SCREEN, and also claims priority to U.S. Provisional Patent Application Ser. No. 60/669,251 filed Apr. 6, 2005 entitled MICROLENS FRONT PROJECTION SCREEN, both of which are incorporated herein by reference in their entirety for all purposes.

TECHNICAL FIELD

The present disclosure relates generally to a display screen, and more specifically to a display screen for use to display images.

BACKGROUND

There are many ways of projecting or displaying an image on a display surface. One method of generating a large screen display is the use of a projection device, such as a projection television. Two types of projection televisions are rear projection televisions and front projection televisions. Typically, the components of a rear projection television are contained in a single unit. In contrast, with a front projection television, the components of the television may be separated from each other. For example, in some front projection television systems, some of the components may be disposed in a first location, while another component may be disposed at a second location.

Components of projection televisions typically include a projector and a screen. An image may be generated by the projector and displayed on the screen. The type of projector and/or screen, or combination thereof, may affect the quality of a displayed image.

Furthermore, environmental variables may also affect the quality of a displayed image. In particular, ambient light in a setting where a projector is projecting an image may negatively affect the contrast of the displayed image. Therefore, the inventors herein have recognized that a display screen which absorbs ambient light and improves contrast of a displayed image may be desirable.

SUMMARY

A display screen is provided. The display screen is configured to receive an image from a display device which includes a first surface with a topography configured to transmit light from the image, and a second surface configured with light reflecting portions and light absorbing portions. The light reflecting portions may be configured to substantially reflect light transmitted from the first surface, and the light absorbing portions may be configured to substantially absorb environmental light.

BRIEF DESCRIPTION OF THE DRAWINGS

The disclosure is illustrated by way of example and not by way of limitation in the figures of the accompanying drawings, in which the like references indicate similar elements and in which:

FIG. 4 is a schematic illustration of a lens system that may be used in the front projection display device of FIG. 2 according to an embodiment of the present disclosure.

FIG. 5 is a schematic illustration of another lens system that may be used in the front projection display device of FIG. 2 according to an embodiment of the present disclosure.

DETAILED DESCRIPTION

A screen for use with a front projection system is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
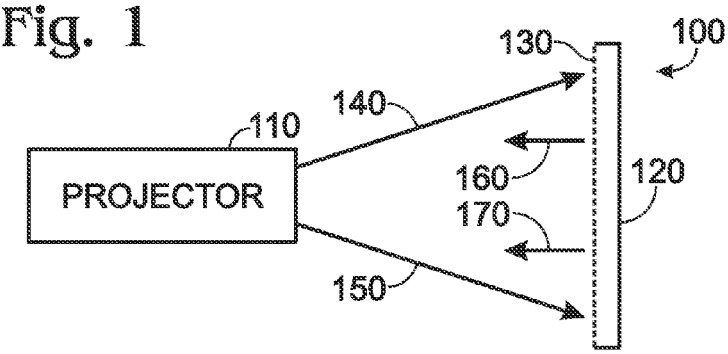
FIG. 1 is a schematic illustration of a front projection display device.

FIG. 1 illustrates a front projection display device. Front projection display device 100 includes a projector 110 and a screen 120. Screen 120 may be a display surface configured to display an image projected by projector or projection device 110. Typically, screen 120 includes a screen surface 130.

During operation of front projection display 100, projector 110 may be configured to generate an image and project the image on to screen 120. Screen 120 may reflect the projected image and direct it toward a viewer (not shown). In some embodiments, screen surface 130 may scatter light so that the projected image is visible to the viewer. Rays 140 and 150 illustrate exemplary paths that light may travel from projector 110 to screen 120, while rays 160 and 170 illustrate exemplary paths that light may travel after reflecting off of screen 120.

Figure 2:
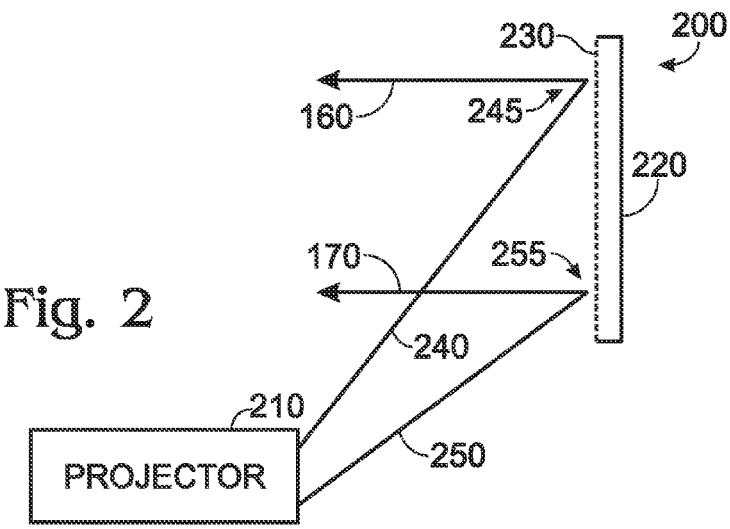
FIG. 2 is another schematic illustration of another front projection display device according to an embodiment of the present disclosure.

FIG. 2 illustrates another front projection device 200. Projector 210 may be configured to project light at a steep angle from the horizontal to screen 220. For example, projector 210 may be offset from screen 220 such that light is projected onto screen 220 at an angle between approximately 30 to 80 degrees from the horizontal. The angle of reflection may vary along the screen. Rays 240 and 250 illustrate exemplary paths that light may travel from projector 210 to screen 220. For exemplary purposes only, ray 240 is shown reflecting and diffusing off of the screen at an angle 245. Angle 245 may be any suitable angle, such as an 80 degree angle. Similarly, ray 250 is shown reflecting off of the screen at angle 255. Angle 255 may be any suitable angle, for example angle 255 may be a 30 degree angle. As with FIG. 1, rays 160 and 170 illustrates the path that light may travel after reflecting off of screen 220.

Various types of screens with variable topography may be used to reflect an image toward a viewer and may be used with front projection devices, such as exemplary devices 100 and 200. For example, the screen may be a microlens screen. As described below, a microlens screen may include a back surface and a lens surface. The back surface may be a reflective surface configured to reflect light back towards a viewer. The lens surface may be configured with a plurality of lenses, such as microlenses. Such screens are described in more detail below.

It should be appreciated that any suitable projection device may be used to project an image onto the screen. As an example, a projection device may be configured to generate an image and project the image to a display screen. As used herein, a projection device may include any suitable display device or image projector, including, but not limited to, a digital projector, a liquid crystal display (LCD) projector, a digital light processing projector, a rear projector, a rear projection television, a front projector, etc. As an example, the projection device may include a light source and an optical system or illumination system. The light source may be adapted to produce a beam of light and project the light towards the optical system. The optical system may be configured to generate an image and project the image to a display screen. The display screen may be configured to reflect the projected image and direct the image toward a viewer. In some embodiments, the screen surface may reflect incoming light so that the projected image is visible to the viewer.

In some embodiments, the display screen may be wall-mounted, ceiling mounted, or otherwise mounted or secured to a frame or other surface. For example, in some embodiments, the screen may be mounted on a tripod, a stand, a frame mount, etc. The screens may be storable, such as through a rolling mechanism, or storable in a casing. In other embodiments, the screens may be foldable or collapsible.

As an example, and not as a limitation, in one embodiment of the present disclosure, projector 210 may be a wide-angle projector. One exemplary wide angle system which may be implemented in a front projection system is described in U.S. patent application Ser. No. 10/222,050 entitled "Wide Angle Lens System Having a Distorted Intermediate Image" filed Aug. 16, 2002, which is incorporated herein by reference.

Figure 3:
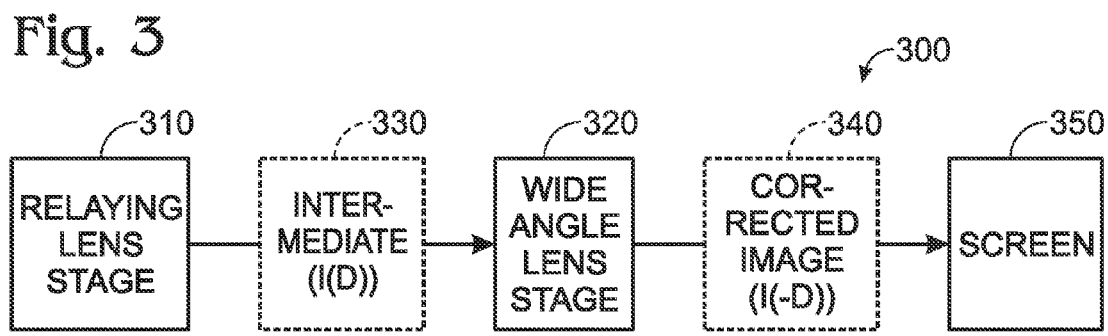
FIG. 3 is a block diagram of a lens system that may be used in the front projection display device of FIG. 2 according to an embodiment of the present disclosure.

In one exemplary wide angle system, illustrated schematically in FIG. 3, the system 300 may include a relay lens stage 310 and a wide angle lens stage 320. Relay lens stage 310 may be configured to generate and project an intermediate image 330 to wide angle lens stage 320. Wide angle lens stage 320 may be configured to generate and project corrected image 340 for display on screen 350.

Intermediate image 330 may be considered a distorted image (I(D)) such that wide angle lens stage receives a pre-distorted image. The distortion caused by wide angle lens stage is such that substantially all the distortion of intermediate image 330 is compensated for (cancelled) by wide angle lens stage 320 to generate image (I(−D)). The reference (I(−D)) is intended to indicate an image without the distortion of the intermediate image. It should be appreciated that the distortion can be to the image shape and/or the focal plane.

For purposes of the present description, the term "distortion" is intended to mean any change from the initial image inputted into the predistortion system. For example, in some embodiments, a distortion in the image includes an alteration in the shape of at least a portion of the image. The term "predistortion" is intended to mean an intentional distortion of an optical image that compensates for (i.e. is substantially equal and opposite to) distortion generated by the wide-angle projection system. It will be appreciated that the predistorted image may be presented in a variety of different configurations depending on the type of downstream distortion for which the predistorted image is intended to compensate.

The system described in FIG. 3 may include additional optics (not shown). For example, the system may include one or more prisms, etc. to direct the image along a desired light path. Moreover, there may be one or more lenses configured to alter the intermediate image or the corrected image.

FIG. 4 illustrates one exemplary embodiment of a wide angle system described above. As illustrated, the system may include a digital micromirror device (DMD) 410 adapted to provide an image to the lens system. An image can be provided to DMD 410 in any manner known in the art. DMD 410 may be configured to selectively reflect light from any suitable light source (not shown) to the lens system. Other types of devices (e.g., microelectromechanical systems (MEMS), grating light valve (GLV), liquid crystal display (LCD), liquid crystal on silicon (LCOS)) may be used to provide an image to the lens system.

Although other devices may be used to provide an image to the lens system, in the illustrated embodiment, prism 420 directs the image to relay lens group 430. Relay lens group 430 projects the image from prism 420 to prism 440 and distorts the image such that intermediate prism 440 receives an intentionally distorted intermediate image.

In one embodiment, relay lens group 430 includes 9 lenses; however, any number of lenses can be used, based on, for example, the desired distortion of the intermediate image, or the overall size of the lens system. The distortion to be caused by relay lens group 430 may be equal and opposite the distortion caused by wide angle lens group 450. In one embodiment, the intermediate image is approximately a half circle image in a warped image plane. In alternate embodiments, other types of distortion may be used. For example, if the full lens field is to be used, the distorted intermediate image would be a generally circular image. The image plane may or may not be warped.

Intermediate prism 440 may provide a 90° fold of the image path. As described below with respect to FIG. 5, the fold is not required. Alternatively, other fold angles, for example, 45°, 30°, 135°, 180°, etc. could be used. Moreover, multiple folds may be used as shown in FIG. 11 and discussed in more detail below. Wide angle lens group 450 projects the distorted intermediate image to a screen for display. Because wide angle lens group 450 causes distortion to the image to be projected and the intermediate image has been pre-distorted by relay lens group 430, the resulting image projected by the lens system has little or no distortion. In one embodiment, the total distortion caused by relay lens group 430, wide angle lens group 450 and any associated prisms may be less than 3%.

In one embodiment, the optic axes of the lenses of relay lens group 430 may be aligned. Similarly, the optic axes of the lenses of wide angle lens group 450 also may be aligned. Typically, wide angle lens group provides a field angle of greater than 100°. In one embodiment, the field angle is 153°; however, any other angle can be provided. In some embodiments, the optical axis of wide angle lens group 450 is perpendicular to the screen so that keystone, or trapezoidal distortion is absent.

FIG. 5 illustrates another embodiment of a wide angle lens system having a distorted intermediate image. The lens system of FIG. 5 is similar to the lens system of FIG. 4 except that the lens system of FIG. 5 is not folded. That is, wide angle lens system 450 is co-axial with relay lens system 430. The lens system of FIG. 5 does not include an intermediate prism. An intermediate prism can be included, if desired.

As described above, the image may be projected to a screen. In some embodiments, the screen may be a microlens screen. The microlens screen may include a plurality of microlenses forming a microlens array. An exemplary microlens may be 50 microns or less. The microlens screen may be configured to improve contrast for use with the front projection device. In contrast to rear projection display devices, front projection display devices may suffer from a lower contrast due to the reflection of ambient light, such as daytime light. By providing a microlens screen the contrast may be improved. Further, the microlens screen may be able to accommodate a steep angle projector as shown in FIG. 2.

It should be appreciated that the embodiments shown herein may be applied to a steep angle projection system. For example, steep angle projection may be effective as the projected light may hit at an angle that is significantly different than most ambient light. The large angle difference may make discrimination between desired and undesired light easier. Thus, elements may be selectively positioned to correlate to the impinging light—elements may be positioned to reflect projected light to a viewer and other elements may be positioned to absorb or redirect ambient light away from the projected image (away from the viewer). The large angle difference may make positioning of the elements easier and may provide a high level of discrimination between image light and ambient light.

Figure 6:
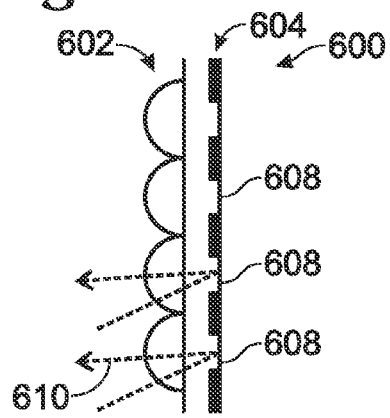
FIG. 6 is an illustration of a screen including a lens surface and a back surface according to an embodiment of the present disclosure.

In some embodiments, such as the embodiment shown in FIG. 6, a screen 600 may be provided with a lens surface 602 and a back surface 604. The lens surface can transmit light to the back surface. The back surface may be a reflective/non-reflective surface, with portions of the surface being reflective and other portions of the surface being non-reflective. In some embodiments, the reflective portion of the back surface may be a white surface that provides a true white, low grain image, while the non-reflective surface may be black and substantially light absorbing in order to provide improved contrast.

For example, the back surface may include a black mat or mask. In some embodiments, the back surface 604 may include appropriately sized and positioned reflecting spaces on the black mask. The remaining black spaces (the non-reflecting spaces) may be considered black absorber or absorbing spaces.

The black mask may be a black film or other suitable film that produces or reflects comparatively little light. Thus, the black mask may be configured to absorb a substantial portion of visible light. In some embodiments, the mask may be substantially non-reflective. It should be appreciated that the mask may include a coating, a surface treatment, a layer, a covering, a sheet, etc. In some embodiments, black photo film or the like may be used as the mask. Further, as an example, the back surface may be comprised an acrylic or poly carbonate material.

White spaces 608 may be created in the black mat and perform as reflecting spaces. For example, the mat may be photosensitive such that white spaces are "burned" into a black mat. The spaces may be configured to correlate to the size and type of lens provided on lens surface 602. Light transmitted through lens surface 602 from the projection device may be projected back towards a viewer from reflecting spaces 608 (such as white spaces). Ambient light and other stray light striking the absorbing spaces may be absorbed. In some examples, a higher percentage of absorbing space to the reflective space is provided, and a substantial amount of the ambient light may be absorbed, thus resulting in reduced ambient light reflection and increasing contrast in the image. Such a screen may provide better viewing during projection of images by a front projection display in a daylight room or a room with environmental light.

Environmental light may come from many sources, such as ceiling fixtures, windows, doors, skylights, etc. Furthermore, environmental light may include ambient light or any light which may lower contrast of the desired image display.

Although the above example includes a screen with a higher percentage of absorbing space to reflective space, it should be appreciated that in some embodiments, a display screen may be configured with a higher percentage of reflective space to absorbing space. Additionally, in some embodiments, various regions of the screen may have a higher percentage of reflective or absorbing space. For example, a top edge of the screen may include additional absorbing space to increase contrast and environmental light effects.

As an example, the selectively reflective and absorbing back surface may be produced by exposing a photoresist or photoreactive material at select distances to light, thus forming areas of reflection and absorption. However other suitable methods may be used to generate a suitable back surface, which both reflects select light and absorbs a substantial portion of the ambient light. For example, in other embodiments, the back surface may be etched or printed, such as by use of a printer to print the reflective/absorbing pattern.

Figure 7:
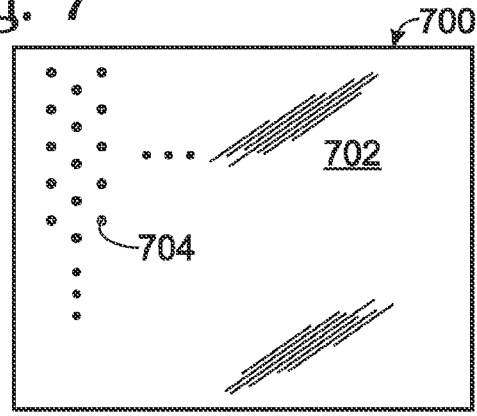
FIG. 7 is an illustration of the back surface with reflecting spaces.

FIG. 7 further illustrates an exemplary back surface. As schematically illustrated, back surface 700 may be a black mat 702, reflecting surfaces (white spaces) 704 may be provided in the mat. A lens surface may be aligned such that projection light is directed through the lens surface onto reflecting surfaces 704 and reflected back toward a viewer. Ambient light may also impinge the surface, but may be absorbed by the mat (and absorbing space or surface 702).

It should be appreciated that the reflecting spaces may be of any suitable configuration. For example, the reflecting spaces may be linear strips, spots, or other configurations. Thus, the absorbing/reflecting pattern (e.g., a black/white pattern) may vary depending on the lens surface, the type of lenses, etc. Moreover, different sized spots, strips, or the like may be provided. For example, larger or smaller reflecting spaces may be used with different types of lenses. Further, larger or smaller reflecting spaces may be used in specific areas of the screens. For example, it may be desired to decrease the reflecting space at the edges of a screen, where the screen may be exposed to more ambient light.

As described above, the lens surface may include a plurality of microlenses. The microlenses or very small lenses can be various shapes and sizes depending on a particular configuration. For example, the lenses may be elliptical lenses, symmetrical lenses, prisms, pyramids, or other aspheric or combination sphere/asphere and planar shapes or any other lens with a desired shape.

One example of a lens surface may be a lenticular screen. A lenticular screen may include multiple very small half-cylindrical lenses (lenticules) spaced close together. In some embodiments, the lenticular screen may be a single-sided reflective screen. Light may impinge the surface of such a lenticular screen at a steep angle and be reflected along a horizontal or other desired plane to a viewer.

Figure 8:
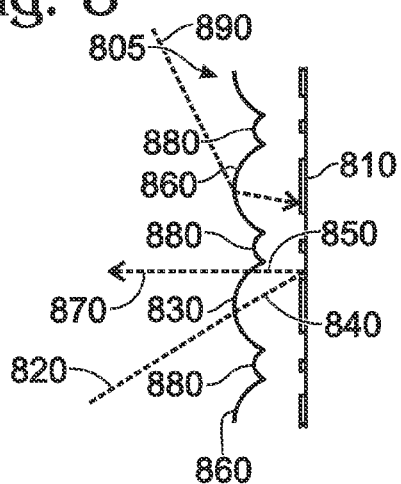
FIG. 8 is a cross-sectional view of a configuration of a screen including a lens surface with different sized microlenses according to an embodiment of the present disclosure.

FIG. 8 illustrates another embodiment for a screen for a front projection system at 800. The screen may include a lens surface 805 and a back surface 810, such as the reflecting/absorbing surface described above. Input light 820 may pass through the face 830 of the lenses and may be slightly refracted 840. The refracted light 840 may then be reflected off of a reflective space on the back surface 810 and redirected back through the screen. The reflective space may be any suitable material. In some embodiments, the reflective space may be a white or highly white material, including but not limited to white paper, white paint, white plastic, or other suitable materials. Further, the reflector may have Lambertian reflectance distribution or other kind of reflectance distribution. The reflected light 850 may pass through the lens toward the viewer as projected light 870.

In some embodiments, an absorbing surface may be provided to absorb ambient or environmental light (e.g. non-projected light). As used herein, ambient light may be light which comes from angles other than light from the projector. For example, in FIG. 8, ambient light 890, (e.g. ceiling reflections at a steep angle from above), may be absorbed by absorbing surfaces on the back surface 810.

In some embodiments, the reflecting surfaces may be configured to redirect the ambient light from the projected image. For example, in some embodiments, the reflecting surfaces may also diffuse light which impinges the surface from select angles. For example, the reflecting surfaces may diffuse/redirect ambient light. Diffusing light, as used herein, includes reflecting light at angles different than what a specular reflector (i.e. mirror) would. By diffusing the ambient light, the projected light may be less disrupted, thus forming a higher contrast image.

As described above, in some embodiments, elements may be provided such that the ambient light may be absorbed and/or reflected/redirected away from the viewer. By reducing the amount of ambient light affecting the projected image, it may be possible to increase the projected image contrast ratio and improve viewability of the image.

It is noted that different-sized lenses may be provided on lens surface 805. For example, large lenses 860 may be interposed smaller lenses 880. Various patterns or configurations may be used to optimize the contrast and image generation on the screen. For example, two, three, four or more different sizes and shapes of lenses may be used. In other embodiments, a single sized lens may be used. In some screens, a plurality of microlenses may be provided with different focal lengths. In other screens, each microlens may be identical in the lens surface. It should be appreciated that various sized reflecting/absorbing spaces may accommodate the lenses.

As a non limiting example, a screen may include a plurality of microlens formations with different focal lengths that are configured to reflect light at different desired angles. The microlens formations can be configured on the screen's surface according to the amount of reflected light desired. In some embodiments, microlens formations may include a pattern of microlenses with varying focal lengths which may be repeated throughout the screen.

Further such lenses may be packed on the lens surface in arrangements configured to reduce space between the lenses. In some embodiments the lenses may be packed in a square packing configuration, a hexagonal configuration, or any other packing configuration providing a desired packing density. The patterns may be repeated throughout the screen. For example, square microlenses units may include four microlenses. In other embodiments, hexagonal units (with identically-sized or different sized microlenses) may be repeated throughout the lens surface.

Figure 8A:
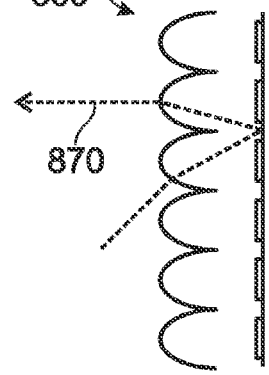
FIG. 8A is another cross-sectional view of a configuration of a screen including a lenticular sheet for use with a front projection display device.

In a similar embodiment, shown in FIG. 8A, the lens surface may be a lenticular sheet, as shown at 860. The light 870 may pass through the face of the lenticules, be slightly refracted, reflected off the back wall, and redirected back through another lenticule. Absorbing surfaces and/or redirection reflecting surfaces, similar to those described above, may be provided to absorb and/or redirect environmental/ambient light.

Still in other embodiments, the lenticular screen may be double sided. For example, the front side of the lenticular screen may include horizontal lenticules configured to change the vertical orientation of the light. The back side of the screen may include vertical lenticules configured to change the horizontal distribution of the light. In some embodiments, the double sided lenticular screen may further include repeatable lens packing patterns and/or spacing which can be combined with the horizontal and vertical lenticule configuration to provide a desired light distribution.

Figure 9:
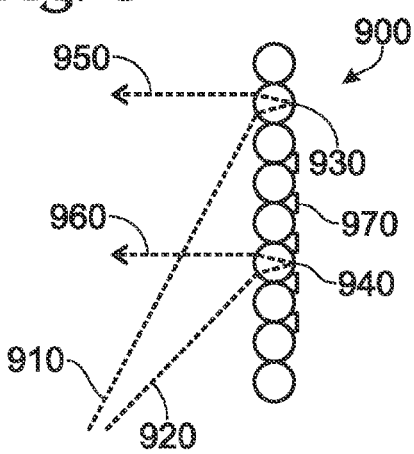
FIG. 9 is another cross-sectional view of a configuration of a screen including bead structures for use with the front projection display device.

FIG. 9 further illustrates, at 900, another embodiment where the screen surface includes a plurality of bead type structures. The beads may be configured to redirect the light depending on the entry angle of the input light. Thus, the shape of the beads may vary depending on the position of the beads in accordance with the angle of input light received. For example, in FIG. 9, input light 910 and 920 is directed toward screen 900. Input light 910 and 920 impinge beads 930 and 940, respectively. Beads 930 and 940 may be configured to redirect the light outwards toward the viewer on a horizontal plane (as indicated by 950 and 960 respectively). It should be appreciated that the entrance angle of light into the beads may vary along the vertical axis of the screen. The refractive and reflective characteristics of the beads may correlate to the various entrance angles.

Figure 10:
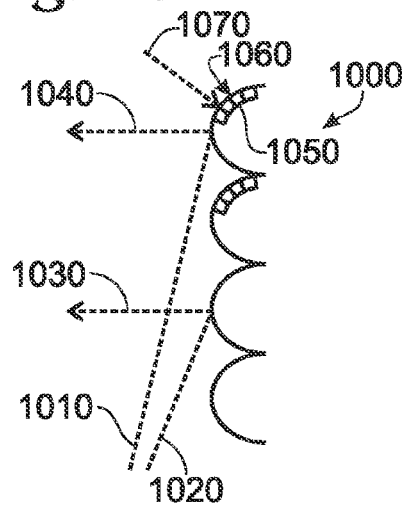
FIG. 10 is another cross-sectional view of a configuration of a screen including reflective bumps for use with the front projection display device.
Figure 11A:
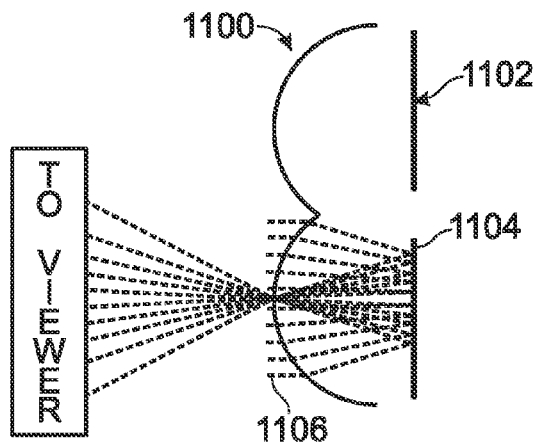
FIGS. 11A-11E are schematic illustrations showing input and output light for a microlens front projection screen including a lens surface and a back surface.
Figure 11B:
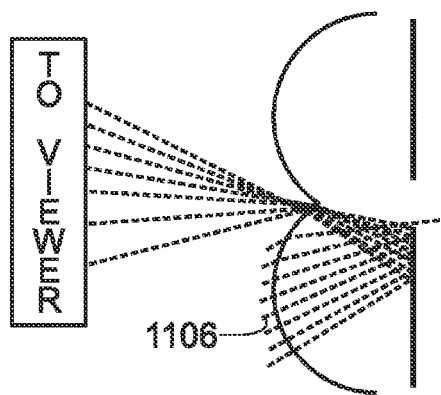
Figure 11C:
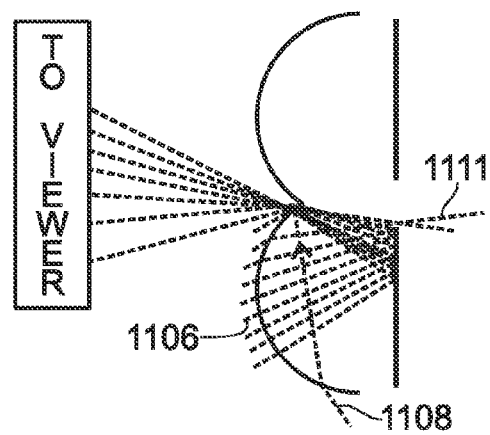
Figure 11D:
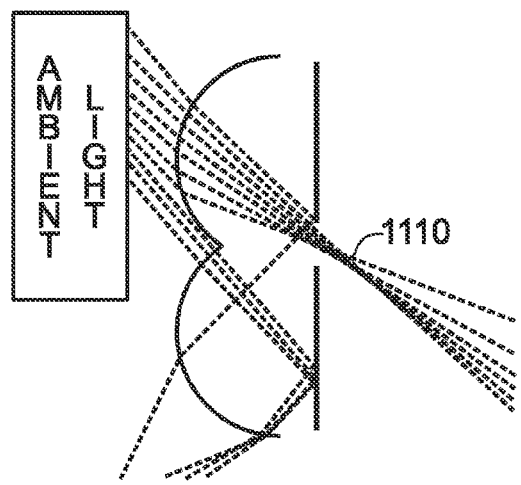
Figure 11E:
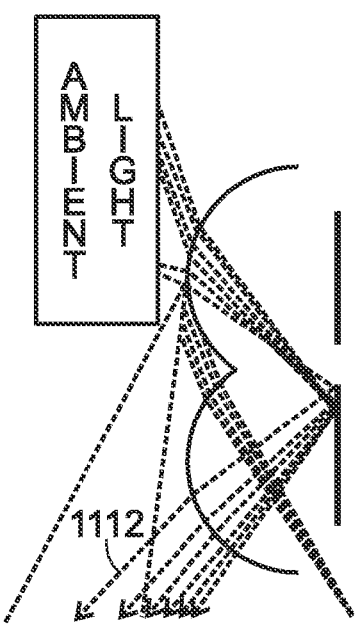

It should be appreciated that the back surface may be provided behind beads 930 and 940. For example, a back surface may be provided with absorbing patches 970 or other suitable absorbing pattern or materials to minimize reflection of non-projection light. Alternatively, the back surface functionalities may be integrated into the beads (an example of such integration is shown in FIG. 10 at 1060). Furthermore, as a nonlimiting example, a beaded screen may be produced by spraying the beads in a uniform pattern onto a back surface, thus providing a consistent distribution of the beads.

FIG. 10 further illustrates another screen surface 1000. As illustrated, the screen may have a plurality of reflective bumps or other suitable surface topology. The bumps may be configured to receive input rays 1010 and 1020 from a substantially steep angle and direct the light back towards a viewer along a horizontal plane as shown by rays 1030 and 1040 respectively.

The above screens may be configured to receive light from a steep angle, such as from the wide-angle lens systems described above. Each screen may further be configured with surface topographies that are adapted to reflect light back to a viewer along a horizontal plane or other suitable viewing plane.

In some embodiments, absorbing patches may be provided within, and/or on the reflective elements. For example, absorbing patches 1050 may be provided such that ambient light 1070 (such as ceiling reflections from a room lamp, etc.) is absorbed. The absorbing patches may be positioned, such as illustrated at 1060, to minimize the effect of specific types of undesired light or reflections which may negatively effect generation of the image. Although shown on the top surface of the reflective elements, in other embodiments, the absorbing patches may be dispersed on the bottom surface, on a combination of the bottom and top surface, etc.

FIG. 11 provides a further illustration of a screen having a lens surface 1100 and a back surface 1102 with reflecting surfaces 1104. Projected light may be directed to the lens surface (comprised of a plurality of microlenses) and passed to reflecting space 1104. The projected light 1106 may be reflected back towards the viewer generating an image on the screen. The reflecting spaces are indicated by the lines, while the non-reflecting surfaces are not shown in the figure. It is noted that in this embodiment, the microlenses on the lens surface are identical in size and shape. However, as noted above, the microlenses may differ in size, shape, and packing configuration without departing from the scope of the disclosure.

FIG. 11 further illustrates a plurality of various light input angles onto the screen. Projected light which is primarily on axis in this case is generally projected back towards the viewer, while ambient light which is incident at steep angles is either absorbed or otherwise not reflected back to the viewer. Specifically, in the illustrated embodiment, the screen is shown accepting input angles of light up to approximately +/−30 degrees. Furthermore, the screen is shown reflecting light to the viewer at +/−30 degrees from any input angle. The graphs in FIG. 11 show the various light input angles from 0 to 80 degrees.

As an example, in one configuration, the following may describe the screen/lens design:
- Square or hexagonal lens packing configuration
- Spherical lens shape, where each lens has a radius of 55 um
- Polymer electrolyte (PE) substrate thickness 50 um
- Lens pitch 89 um
- 22.1 um sag at corners
- 66 um diameter reflector spots Although this example provides distinct parameter values, it should be appreciated that these values are for illustrative purposes and could be changed to a different desired configuration without departing from the scope of this disclosure.

As further examples and not as a limitation, the following ranges are provided. However, it should be appreciated that the ranges are for illustrative purposes only:
- Focal length of lenses: 100-200 um
- Lens vertex to white space distance 80-150 um
- Lens pitch 50-100 um
- Absorption to reflection (black to white) ratio 25-75%

As a further note, the above front projection screen does not require a collimating layer. In contrast to a rear projection screen, the angular spread of the input light is approximately +/−15 degrees (in contrast to the larger spread of a rear projection screen), and thus no collimating layer may be needed. In some embodiments, larger white spaces may be needed to accommodate the angular spread.

Referring in more detail to FIG. 11, in some embodiments, absorbing surfaces or pass through surfaces may be used to minimize reflection of undesired ambient light. For example, in FIG. 11C, non-projected light 1108 may be directed away from the reflecting surfaces such that it passes through 1111, such as to an absorbing surface (not shown). Similarly, in FIG. 11D, ambient light is illustrated hitting the lens surface at a steep angle from above. Such ambient light may be absorbed, as indicated at 1110. FIG. 11E provides another embodiment, where the ambient light (such as light from a ceiling lamp or ceiling reflections) may be directed away from the projected image. For example, the undesired ambient light may be reflected downwards (such as toward the floor) as indicated at 1112 away from the projected image. As such, effects from the ambient light on the projected image may be minimized.

Figure 12:
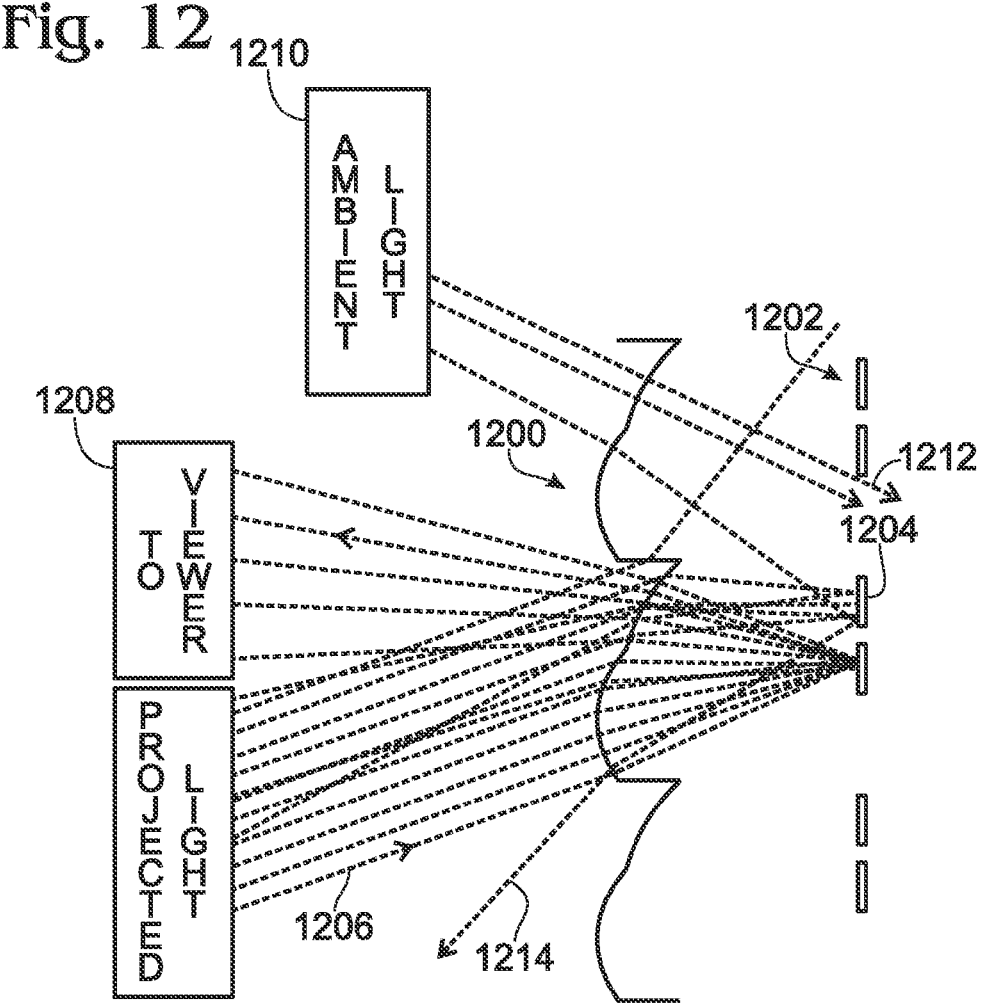
FIG. 12 is another cross-sectional view of a configuration of a screen including saw tooth-shaped lens structures for use with a front projection display device.

FIG. 12 provides a further illustration of a screen having a lens surface 1200 and a back surface 1202 with reflecting surfaces 1204. Projected light 1206 may be directed to the lens surface (comprised of a plurality of microlenses) and passed to reflecting space 1204. The projected light may be reflected back towards the viewer 1208 generating an image on the screen. The reflecting spaces are indicated by the lines, while the non-reflecting surfaces are not shown in the figure. Ambient light 120 may be directed to the non-reflecting surfaces as indicated at 1212. The light may be absorbed by the non-reflecting surfaces. In some embodiments, the reflecting surfaces may be configured such that ambient light hitting the reflecting surfaces (at predefined angles) may be redirected away from the viewer (such as indicated at 1214), thus reducing the effects of the ambient light on the projected image.

The microlenses can be arranged in a saw tooth configuration. This configuration may allow a larger amount of projected light to be passed through the microlenses from a particular angle, while still reflecting a substantial amount of environmental light.

In some embodiments, a saw tooth microlens configuration may include microlenses with faces of varying angles which can create larger or smaller surface areas. A display screen surface may be configured with a saw tooth configuration wherein different sections may include microlenses with varying surface areas based on a desired amount of transmitted light. Furthermore, in some embodiments, the angles of the saw tooth microlens faces may vary continuously throughout a display screen. In other embodiments, the angles of the saw tooth microlens faces may vary stepwise throughout a display screen.

The saw tooth configuration and one or more of the above microlens configurations may be used with a steep angle projector or display system. Further, the position of the reflecting/no-reflecting surfaces may further provide enhanced image display with steep angle projection. The microlens and/or the reflecting/non-reflecting spaces may increase image contrast and increase environmental light effects.

It should be appreciated that each of the screens described above may improve image contrast. The reflecting/non-reflecting back plate may reduce ambient light affects. For example, the disclosed screen may be useful in a variety of environments. For example, the screen may be used in classroom settings where it is difficult to remove the ambient room light. Further, such screens may be useful in home environments where windows and various light sources may prevent a user from decreasing all the light in the room. Such improved image quality in the presence of daytime and dimmed light may enable a user to use the display screen as a television, a computer monitor, a gaming monitor, or signage. Similarly, such screens may be useful in business environments, lecture halls, public facilities, etc., where ambient room light may be used during image display.

The screen further may be configured to accommodate handling and touching by a user. Additionally, the screen surfaces may be configured to be easily cleaned. For example, coatings and other surface treatments may be applied to the screen surface to reduce static, dust, etc and/or to protect the surface. Moreover, the grooves and other surface topography may be substantially sized to enable easy cleaning of the surface. In some embodiments, the screen surfaces may include anti-static coatings and other surface treatments to enhance image quality and durability of the screen.

Although described in regards to a front projection display system, the screen may be implemented for other display systems. For example, the display screen may be used as a screen for a front projection display system, a rear projection display system, etc.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

We claim:

1. A display screen configured to receive an image from a steep angle projector, the display screen comprising:
   a first surface with a topography configured to transmit light from the image; and
   a second surface configured with light reflecting portions and light absorbing portions, wherein the light reflecting portions are configured to substantially reflect light transmitted from the first surface for display of the image, and the light absorbing portions are configured to substantially absorb environmental light.

2. The display screen of claim 1, wherein the topography includes a plurality of bead structures.

3. The display screen of claim 1, wherein the topography includes a plurality of microlenses.

4. The display screen of claim 3, where the reflecting portions of the second surface correlate with at least one of the size and type of microlenses.

5. The display screen of claim 3, wherein the microlenses vary in size.

6. The display screen of claim 3, wherein the microlenses are arranged in a hexagonal configuration.

7. The display screen of claim 1, wherein the second surface is a light reflecting material and the light absorbing portions are treated with a light absorbing material.

8. The display screen of claim 1, wherein the second surface is a light absorbing material and the light reflecting portions are added to the surface.

9. The display screen of claim 1, wherein light reflected off of the second surface is transmitted back through the first surface or image display.

10. A projection system comprising:
    a steep angle projector configured to project an image;
    a display screen adapted to receive the image, wherein the display screen includes a first surface and a second surface; and
    the first surface includes a plurality of microlenses configured to transmit the image to the second surface;
    the second surface includes reflective portions and non-reflective portions;
    the reflective portions are configured to substantially reflect light into a viewable plane, and the non-reflective portions are configured to substantially absorb ambient light.

11. The projection system of claim 10, wherein the microlenses vary in size.

12. The projection system claim 10, wherein the reflective portions correlate to light input from the first surface.

13. The projection system of claim 10, wherein the percentage of non-reflective portions to reflective portions is less than fifty percent.

14. The projection system of claim 10, wherein the percentage of non-reflective portions to reflective portions is greater than fifty percent.

15. The projection system of claim 10, wherein the reflective portions are configured to project projected light and redirect ambient light substantially away from the viewable plane.

16. The projection system of claim 10, wherein the microlenses are one of a lens, a prism, a pyramid or combination of asphere, an asphere or a planar shape.

17. A method of displaying an image projected from a front projection system, the method comprising:
    receiving the image at a substantially steep angle on a display screen which includes a first surface comprising a plurality of micro lenses;
    transmitting the image through the microlenses to a second surface;
    reflecting a substantial amount of light via reflecting portions of the second surface into a viewable plane; and
    absorbing a substantial amount of ambient light striking absorbing portions of the second surface.

* * * * *

UNITED STATES PATENT AND TRADEMARK OFFICE
CERTIFICATE OF CORRECTION

PATENT NO. : 7,667,893 B2
APPLICATION NO. : 11/550375
DATED : February 23, 2010
INVENTOR(S) : Peterson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this

Seventh Day of December, 2010

David J. Kappos
*Director of the United States Patent and Trademark Office*